United States Patent

James

[15] 3,705,134
[45] Dec. 5, 1972

[54] POLYAMIDE CONTAINING ORGANO METALLIC COMPOUND

[72] Inventor: David James, Pontypool, England

[73] Assignee: Imperial Chemical Industries Limited, London, England

[22] Filed: July 24, 1970

[21] Appl. No.: 58,185

[52] U.S. Cl. .............................. 260/78 R, 260/78 L
[51] Int. Cl. ........................................ C08g 20/20
[58] Field of Search........ 260/78 R, 78 A, 78 L, 78 P, 260/78 S, 78 SC

[56] References Cited

UNITED STATES PATENTS

| | | | |
|---|---|---|---|
| 3,153,010 | 10/1964 | Jenkins et al. | 260/78 R |
| 3,160,609 | 12/1964 | Congiondi et al. | 260/78 R |
| 3,160,610 | 12/1964 | Congiondi et al. | 260/78 R |
| 3,272,776 | 9/1966 | Caldwell | 260/78 R |
| 2,924,586 | 2/1960 | Lotz et al. | 260/78 SC |
| 3,189,575 | 6/1965 | Horn et al. | 260/78 SC |
| 3,405,099 | 10/1968 | Taber | 260/78 P |

FOREIGN PATENTS OR APPLICATIONS 684,876   2/1968   Japan

OTHER PUBLICATIONS

Chemical Abstracts – Vol. 70, 1969. p. 48052r

Primary Examiner—Harold D. Anderson
Attorney—Thomas J. Morgan and Stephen D. Murphy

[57] ABSTRACT

Synthetic fiber and film forming polyamides containing organic compounds of metals of groups IV or V of the Periodic Table. The pressure of such compounds results in an increase in the rate of relative viscosity rise during the polyamidation reaction and an enhancement of the dyeability of the final polymer.

5 Claims, No Drawings

POLYAMIDE CONTAINING ORGANO METALLIC COMPOUND

The present invention relates to synthetic polyamides and particularly, though not exclusively, to synthetic fiber and film forming polyamides containing organic metal compounds.

The Applicants have found that the use of certain organic metal compounds in the production of synthetic polyamides and their subsequent presence in the polymer can give rise to a number of beneficial effects. These effects include an increase in the rate of relative viscosity rise during the polymerization reaction and an enhancement of the dyeability of the resultant polymer.

By relative viscosity is meant the ratio of the viscosity of a solution of the polymer to the viscosity of the pure solvent.

Synthetic fiber and film forming polyamides to which the present invention is applicable include both homo- and copolyamides, e.g. those derived from polyhexamethylene adipamide, polyhexamethylene suberamide and polycaprolactam.

Organic compounds suitable for use in the present invention include those of the following general formulas:

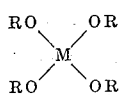

where M represents a metal of groups IV or V of the Periodic Table and R is an alkyl or aryl group.

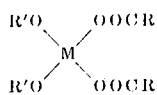

where M represents a metal of groups IV or V of the Periodic Table, R is an alkyl group and R' an alkyl or aryl group.

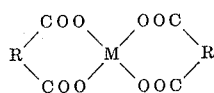

where M represents a metal of groups IV or V of the Periodic Table and R is an alkylene or arylene group.

Specifically M may be titanium, zirconium, hafnium, vanadium, niobium, or tantalum.

Alternatively polymeric derivatives of the above organic compounds may be employed, either separately or in conjunction with the monomer.

Thus, the present invention provides a synthetic polyamide composition containing one or more organic compounds of titanium, zirconium, hafnium, vanadium, niobium or tantalum.

The invention also provides a process for increasing the rate of relative viscosity rise during a polyamidation reaction by the addition thereto of one or more organic compounds of titanium, zirconium, hafnium, vanadium, niobium or tantalum.

The invention further provides a process for enhancing the dyeability of synthetic polyamides by the addition thereto before or during the polyamidation reaction of one or more organic compounds of titanium, zirconium, hafnium, vanadium, niobium or tantalum.

Up to 10 mole percent of organic metal compound or compounds may be added before or during the early stages of polymerization, though it is preferred to add 0.1 to 3 mole percent of the metal compound or compounds.

Preferably, the polyamide composition is capable of being melt-spun into continuous filaments and contains an organic compound of titanium.

The organic metal compounds of the present invention possess the further advantage, that, unlike conventional acid polyamidation catalysts which can catalyze hydrolysis of the polyamide and consequently may promote the degradation of the polymer under even mild hydrolytic conditions, they are converted to inactive metal hydroxides after heating the polyamide for quite short periods or on subjecting the polymer to mild hydrolytic conditions. Moreover, conventional acid catalysts being ionic in character often have an undesirable coagulating effect on fine dispersions of pigments, delustrants and the like, which may be added to polyamides. The organic metal compounds of the present invention are much more compatible with these and other polymer additives.

In the following examples of the present invention which are by way of illustration only, parts and percentages are by weight.

EXAMPLE 1

The effect of tetra-alkyl titanates on the rate of polymerization of hexamethylene adipamide.

After dry-tumbling the titanate with hexamethylene diammonium adipate, the intimate mixture was heated in a sealed tube in an atmosphere of nitrogen at 220° C. for 4 hours. Rates of polymerization were followed by "finishing" the pre-polymer at 290° C. in a laboratory pot under steam at atmospheric pressure.

The pre-polymer was "finished" for various periods of time and its relative viscosity determined. Alkyl titanates were found to have a marked effect on the rate of amide polymerization, as may be seen from Table 1.

TABLE 1

| | Relative Viscosity | |
|---|---|---|
| Time of "finishing" under steam at 290°C (min.) | Polyhexamethylene adipamide control | Polyhexamethylene adipamide + 1.4 mol % tetra-iso propyl titanate |
| 20 | 20 | 32 |
| 30 | 34 | 46 |
| 40 | 42 | 54.5 |
| 50 | 46.5 | 60 |
| 60 | 50 | 56 |

Branch chain alkyl titanates are even more effective than their linear homologues. This is shown in Table 2, where a comparison of the effect of tetra-n-butyl and tetra-t-butyl titanates on the rate of polymerization of hexamethylene adipamide has been made.

TABLE 2

| | relative viscosity test minus relative viscosity control |
|---|---|
| Time of "finishing" at 290°C under | |

| steam (min.) | 1.4 mol % tetra-n-butyl titanate | 1.4 mol % tetra-t-butyl titanate |
|---|---|---|
| 30 | 15.5 | 17.2 |
| 40 | 12.5 | 19.1 |
| 50 | 8.3 | 15 |
| 60 | 5 | 7 |

EXAMPLE 2

Effect of tetra-alkyl titanates on the rate of polymerization of hexamethylene suberamide.

Polyhexamethylene suberamide pre-polymers containing 0.67, 0.92 and 1.2 mole percent of tetra-methyl titanate were "finished" in a laboratory pot at 290° C. for 1 hour under steam at atmospheric pressure. A control polyamide without additive was simultaneously "finished" under the same conditions in a similar pot. The relative viscosity of the four polymers after finishing is given in the Table below. As will be seen, the presence of the alkyl titanate had a significant effect on the rate of amide polymerization.

TABLE 3

| Polymer | Relative Viscosity after "finishing" |
|---|---|
| Polyhexamethylene suberamide control (no additive) | 33.5 |
| Polyhexamethylene suberamide + 0.67 mole % of tetra-methyl titanate | 54.2 |
| Polyhexamethylene suberamide + 0.67 mole % of tetra-methyl titanate | 56.2 |
| Polyhexamethylene suberamide + 1.2 mole % of tetra-methyl titanate | 58 |

EXAMPLE 3

In addition to increasing the rate of polymerization of hexamethylene adipamide, alkyl titanates also produce base stabilized polymers (i.e. polymers containing more amine end groups than carboxylic end groups) as shown below in Table 4. As would be expected, these polymers were deep dyeing and yarns derived therefrom when dyed with Solway Blue at pH8 in the conventional manner dyed deeper than a control yarn without additive. The depth of dyeing increasing with increasing additive concentration until a limit was reached.

TABLE 4

| Fully polymerized polyhexamethylene adipamide; concentration of methyl titanate mol % | (Carboxylic end groups C minus amine end groups A) per $10^6$ g. of polyamide. |
|---|---|
| 0.1 | 11 |
| 0.2 | 6.5 |
| 0.5 | −12.6 |
| 0.7 | −28 |
| 0.9 | −43 |
| 1.0 | −47 |
| 1.1 | −68 |

EXAMPLE 4

The base stabilized nature of the polyhexamethylene adipamide of this invention may be "counteracted" by the addition prior to the polymerization reaction, of the requisite amount of adipic acid. When this is done, the rate of polymerization is further increased as shown in Table 5.

TABLE 5

| Time of "finishing" at 290°C under steam (min.) | relative viscosity test minus relative viscosity control | |
|---|---|---|
| | Base-stabilized polymer containing 0.7 mol % tetra-methyl titanate | Balanced end-group polymer containing 0.7 mol % tetra-methyl titanate |
| 20 | 0.5 | 5 |
| 30 | 1.3 | 10.3 |
| 40 | 2.7 | 7.4 |
| 50 | 3.7 | 6.1 |

EXAMPLE 5

Effect of tetra-aryl titanates on the rate of polymerization of hexamethylene adipamide.

Example 1 was repeated with the exception that the tetra-iso-propyl titanate was replaced by tetra-phenyl titanate.

As can be seen from Table 6, tetra-phenyl titanate also has a marked effect on the polymerization rate.

TABLE 6

| Time of "finishing" under steam at 290°C (min.) | Relative Viscosity | |
|---|---|---|
| | Polyhexamethylene adipamide control | Polyhexamethylene adipamide + 1.8 mol % tetra-phenyl titanate |
| 20 | 17 | 21 |
| 30 | 30.6 | 43.3 |
| 40 | 40.8 | 50.9 |
| 50 | 46.1 | 53.9 |

EXAMPLE 6

Example 1 was again repeated with the exception that the tetra-iso-propyl titanate was replaced by tetra-n-butyl zirconate. As with Example 1 the presence of the zirconate had a significant effect upon the rate of polymerization as shown in Table 7.

TABLE 7

| Time of "finishing" under steam at 290°C (min.) | Relative Viscosity | |
|---|---|---|
| | Polyhexamethylene adipamide control | Polyhexamethylene adipamide + 0.86 mol % tetra-n-butyl zirconate |
| 20 | 26.6 | 33.2 |
| 30 | 31 | 44.1 |
| 40 | 45.6 | 53 |
| 50 | 46.4 | 54.2 |
| 60 | 50.3 | 54.9 |

EXAMPLE 7

Effect of poly alkyl titanates on the rate of polymerization of hexamethylene adipamide.

Example 1 was repeated with the exception that tetra-iso propyl titanate was replaced by poly-n-butyl titanate.

As can be seen from Table 8, poly-n-butyl titanate also has a noticeable effect on the polymerization rate.

TABLE 8

| Time of "finishing" under steam at 290°C (min.) | Relative Viscosity | | |
| --- | --- | --- | --- |
| | polyhexamethylene adipamide control | polyhexamethylene adipamide + 1.1 mol % poly-n-butyl titanate | polyhexamethylene adipamide + 1.5 mol % poly-n-butyl titanate |
| 30 | 30.8 | 33.3 | 36.5 |
| 40 | 40.8 | 41.6 | 42.0 |
| 50 | 43.3 | 45.9 | 44.0 |

EXAMPLE 8

Effect of di-alkoxy di-acylated titanates on the rate of polymerization of hexamethylene adipamide.

The method outlined in Example 2 was repeated with the exception that 0.6 mole percent of di-isopropoxy titanium distearate was used.

A similar useful effect was observed as shown below:

TABLE 9

| Polymer | relative viscosity |
| --- | --- |
| Polyhexamethylene adipamide control (no additive) | 47 |
| Polyhexamethylene adipamide + 0.6 mole % di-isopropoxy titanium diutearate | 69.6 |

What I claim is:

1. A synthetic linear saturated aliphatic polycarbonamide of a dicarboxylic acid and a diamine, said polycarbonamide having an increased depth of dyeing and being capable of being spun into continuous filaments, said polyamide containing from 0.1 to 10 mol percent of one or more organic compounds selected from the group having the following structural formulas:

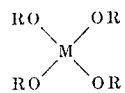 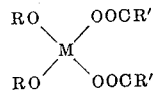

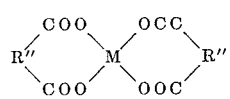

wherein R is an alkyl or aryl group, R' is an alkyl group, R" is an alkylene or arylene group and M represents a metal selected from the group consisting of titanium, zirconium, hafnium, vanadium, niobium and tantalum.

2. The polycarbonamide of claim 1 wherein said organic compounds have the following general formula:

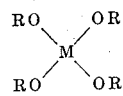

wherein R is an alkyl or aryl group and M represents a metal selected from the group consisting of titanium, zirconium, hafnium, vanadium, niobium and tantalum.

3. The polycarbonamide of claim 1 wherein said organic compounds have the following structural formula:

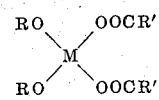

wherein R is an alkyl or aryl group, R' is an alkyl group and M represents a metal selected from the group consisting of titanium, zirconium, hafnium, vanadium, niobium and tantalum.

4. The polycarbonamide of claim 1 wherein said organic compounds have the following structural formula:

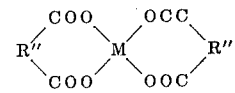

wherein R" is an alkylene or arylene group and M represents a metal selected from the group consisting of titanium, zirconium, hafnium, vanadium, niobium and tantalum.

5. The polycarbonamide of claim 1 wherein M is titanium.

* * * * *